Aug. 26, 1969    R. E. NEUMEIER    3,463,108

AMPHIBIOUS VEHICLE

Filed May 22, 1968    4 Sheets-Sheet 1

INVENTOR.

ROBERT E. NEUMEIER

Aug. 26, 1969 R. E. NEUMEIER 3,463,108
AMPHIBIOUS VEHICLE
Filed May 22, 1968 4 Sheets-Sheet 2
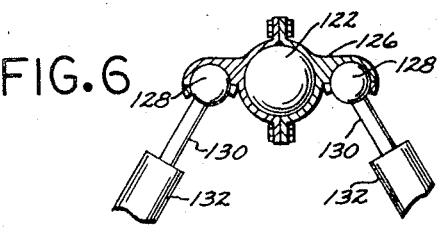
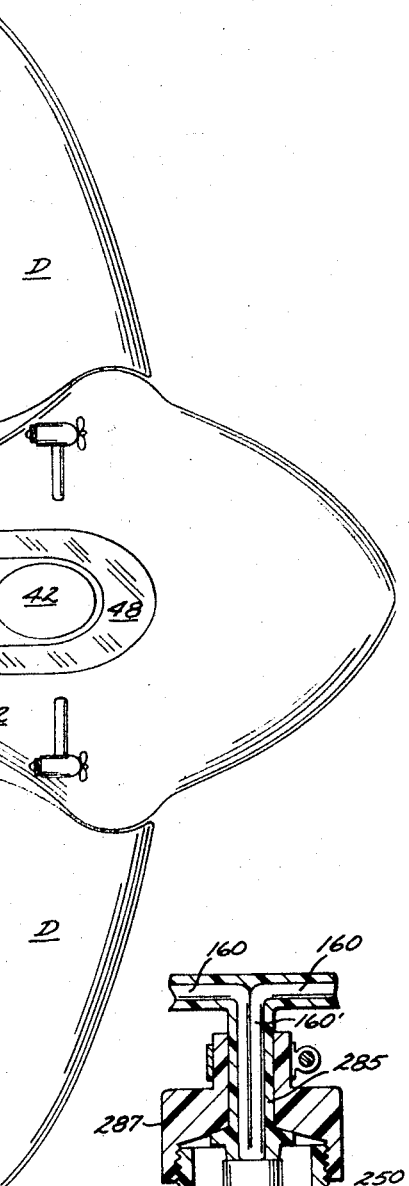
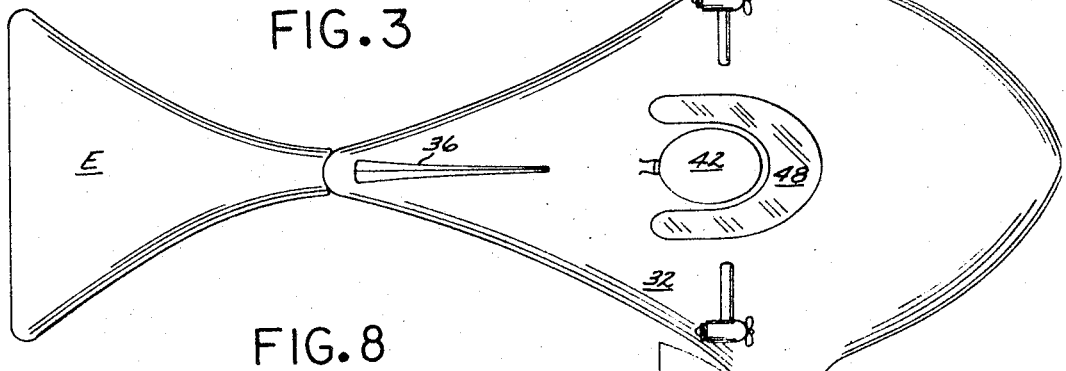
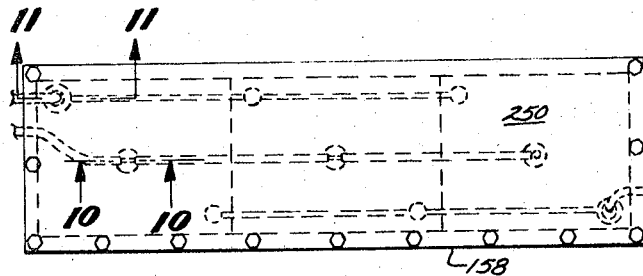
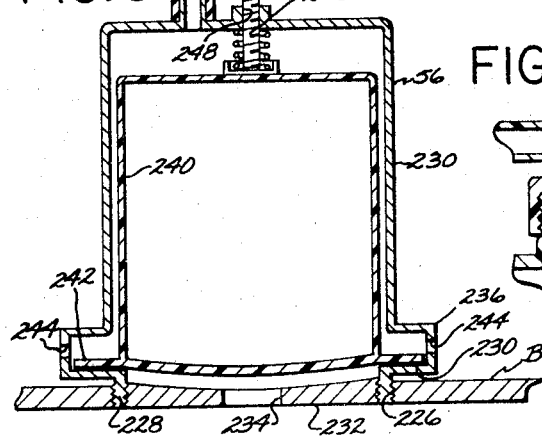
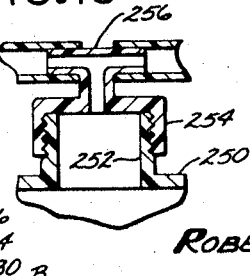
INVENTOR.
ROBERT E. NEUMEIER

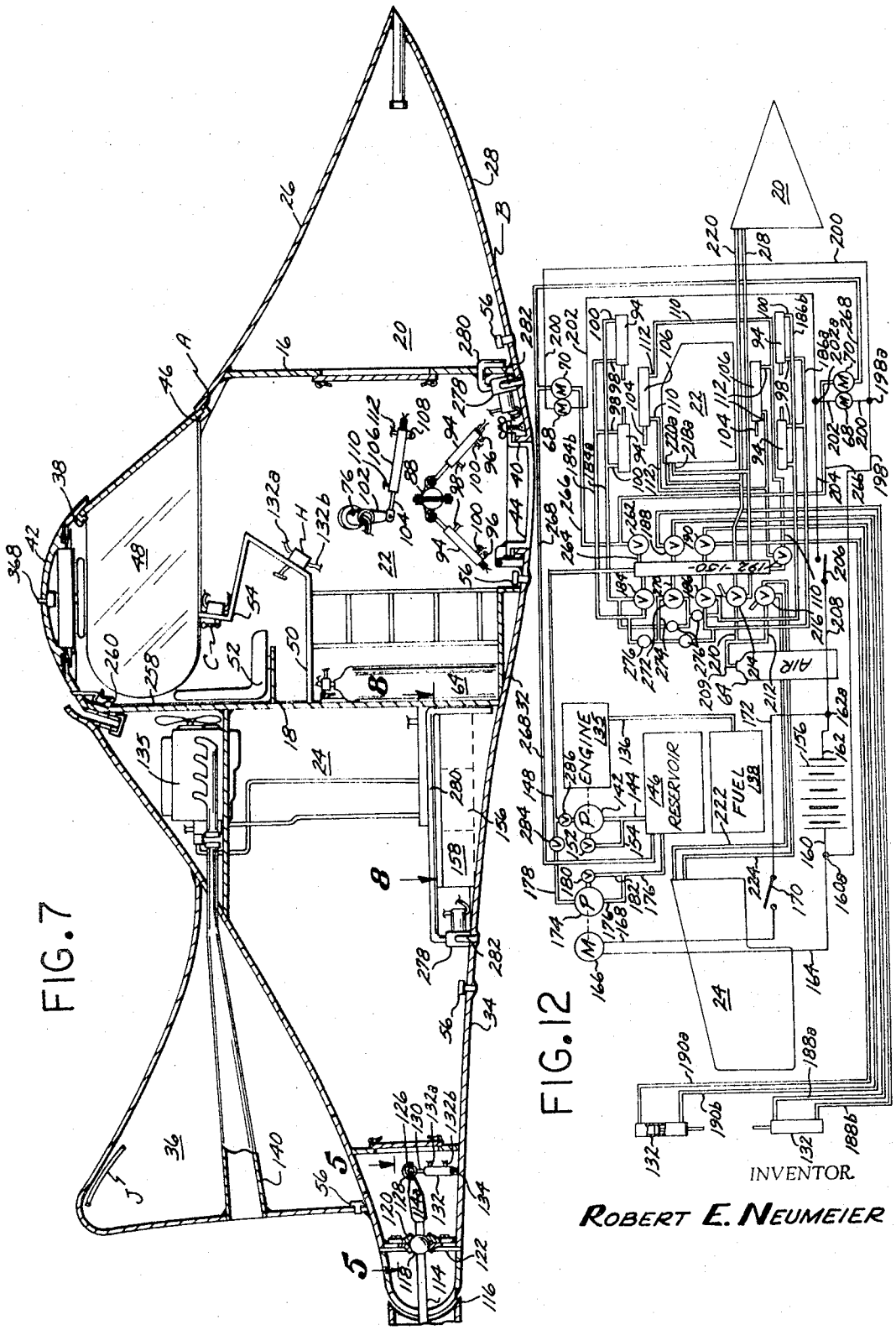

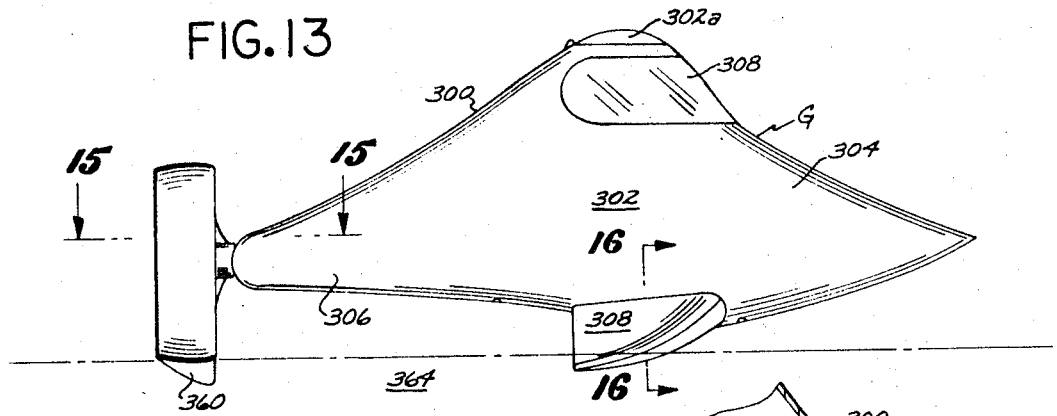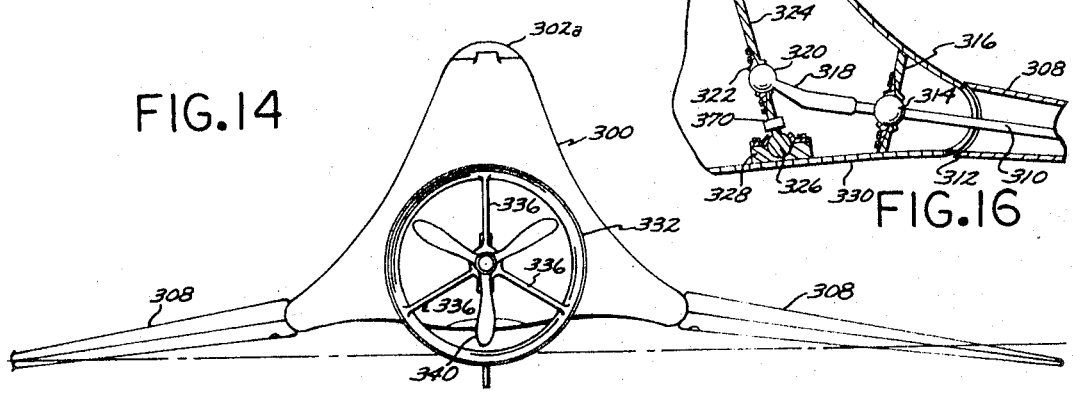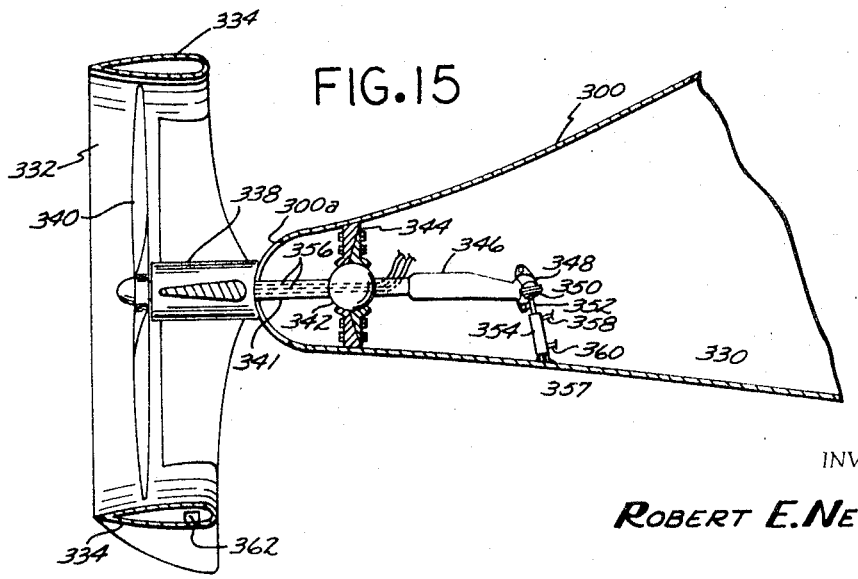

United States Patent Office 3,463,108
Patented Aug. 26, 1969

3,463,108
AMPHIBIOUS VEHICLE
Robert E. Neumeier, 2028 W. 16th St.,
Long Beach, Calif. 90813
Filed May 22, 1968, Ser. No. 731,095
Int. Cl. B63g 8/00; B64c 3/38
U.S. Cl. 114—16                                    11 Claims

ABSTRACT OF THE DISCLOSURE

A power-operated amphibious vehicle capable of traveling when submerged in a body of water, as well as skimming along the surface of the water and flying thereabove.

BACKGROUND OF THE INVENTION

Field of the invention

A power-operated vehicle for traveling both under the water as well as in a skimming thereon or flying thereabove.

Description of the prior art

In the past numerous aircraft and submarine designs have been devised, but to date no vehicle has been evolved that embodies the functions of both types of vehicles, which in addition permits a diver to quickly leave the vehicle while it is submerged, yet easily reenter the same after his mission has been accomplished. The amphibious vehicle of the present invention is ideally suited for operations where a diver must be transported a substantial distance before urgent rescue, salvage, or repair work may be initiated.

SUMMARY OF THE INVENTION

A power-operated amphibious vehicle capable of operating under water or traveling at a rapid rate thereabove when in either a skimming or flying position, and one which after arriving at its destination, permits a diver to quickly enter the water to perform a rescue, salvage or repair operation. A major object of the present invention is to provide a vehicle that can skim or fly over the surface of a body of water at a high rate of speed to a desired destination where it may submerge to permit a diver to quickly leave the same in a rescue effort, or to perform a salvage or repair operation, and which also permits a rescued person to be brought into the vehicle interior.

Another object of the invention is to supply an amphibious vehicle, the hatch cover of which may be opened during submersion to establish communication between the interior and exterior of the vehicle with a minimum of inconvenience.

A further object of the invention is to supply an amphibious vehicle that is provided with oppositely disposed, outwardly projecting wings which can be moved both horizontally and vertically, as well as pivoted on their longitudinal axes for use in guidance of the vehicle, yet with the wings being adapted to be disposed in such positions as to act as hydrofoils when the craft is skimming along the surface of a body of water.

A still further object of the invention is to furnish an amphibious vehicle incorporating a tail structure that may be pivoted along the longitudinal axis thereof, as well as moved both vertically and horizontally to augment the control of the vehicle achieved by movement of the wings.

BRIEF DESCRIPTION OF THE DRAWINGS

FIGURE 3 is a top plan view of the vehicle;

FIGURE 6 is a vertical cross-sectional view of one of the wing control units, taken on the line 6—6 of FIGURE 4;

FIGURE 7 is a longitudinal cross-sectional view of the vehicle;

FIGURE 8 is a fragmentary top plan view of a portion of the vehicle, taken on the line 8—8 of FIGURE 7;

FIGURE 9 is a longitudinal cross-sectional view of a water ballast control valve;

FIGURE 10 is a fragmentary vertical cross-sectional view of a portion of the vehicle, taken on the line 10—10 of FIGURE 8;

FIGURE 11 is a fragmentary vertical cross-sectional view of a battery connection, taken on the line 11—11 of FIGURE 8;

FIGURE 12 is a diagrammatic layout of the power and control system used in the first form of the vehicle;

FIGURE 13 is a side elevational view of a second form of the vehicle which is capable of submerging as well as skimming along the surface of a body of water;

FIGURE 14 is a rear elevational view of the second form of the vehicle;

FIGURE 15 is a fragmentary longitudinal cross-sectional view of the second form of the vehicle, taken on the line 15—15 of FIGURE 13; and FIGURE 16 is a fragmentary cross-sectional view of the second form of the vehicle, taken on the line 16—16 of FIGURE 13.

DESCRIPTION OF THE PREFERRED EMBODIMENTS

Figure 1:
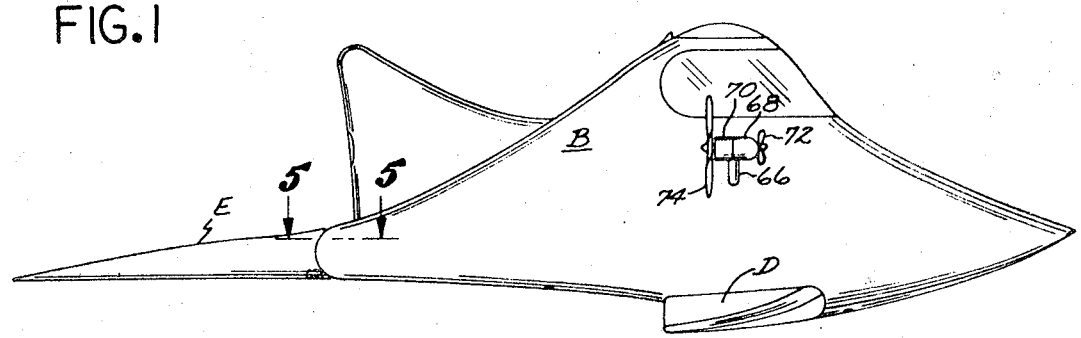
FIGURE 1 is a side elevational view of a first form of the vehicle.

The first form of the amphibious vehicle A is shown in FIGURES 1, 2, 3 and 7, and is power-driven both when submerged as well as when skimming along the surface of a body of water or flying thereabove.

Vehicle A is partially defined by a hull B in the interior of which two water-tight transverse partitions 16 and 18 are provided that divide the hull into forward, intermediate and rear compartments 20, 22, and 24, respectively, as shown in FIGURE 7. That portion of hull B forwardly of partition 16 includes a downwardly and forwardly extending upper shell 26, an upwardly and forwardly extending bottom shell 28, and these two shells are joined by curved side wall shells 30. The rear ends of the shells 26, 28, and 30 merge into a shell 32, the interior of which comprises the intermediate compartment 22. Compartment 22 is of substantially greater transverse cross section than either the forward compartment 20 or rear compartment 24. Compartment 24 is defined by a rearwardly tapering shell 34 from which a fixed hollow fin 36 extends upwardly.

Openings 38 and 40 are formed in the upper and lower portions of shells 32 that are normally closed by two hatches 42 and 44, respectively. A U-shaped cut-out portion 46 spanned by a sheet 48 of a transparent rigid material of sufficient thickness is provided in shell 32 below opening 38, which serves to withstand the maximum pressure to which it will be subjected when vehicle A is submerged.

Partition 18 supports a forwardly extending platform 50, best seen in FIGURE 7. The partition 18 also supports a forwardly extending seat 52 for the operator's use. A panel 54 extends upwardly from platform 50 and on which controls C are mounted for use in maneuvering the vehicle A, which controls will later be described in detail. The transparent sheet 48 is so positioned as to act as a window for the operator (not shown) when the operator is supported on seat 52. Three water ballast inlet valves 56 are disposed in shell 28 and the lower portion of shell 34 (FIGURE 7). The detailed structure of one of the valves 56 is shown in FIGURE 9.

Figure 2:
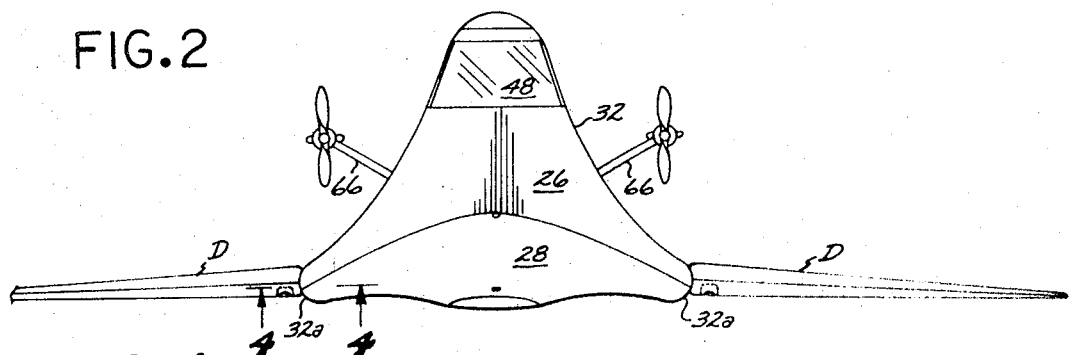
FIGURE 2 is a front elevational view of the vehicle.

In FIGURE 2 two supports 66 are shown that extend upwardly from opposite sides of shell 26, and are rotatably adjustable relative thereto. An electric motor 68 is associated with each support 66, and a hydraulic motor 70 is mounted on the outer end of each support. Each electric motor 68 drives a propeller 72 that is used for motive power when vehicle A is submerged. Each hydraulic motor 70 drives a propeller 74 when the vehicle A is skimming over the surface of the water or flying thereabove.

Figure 4:
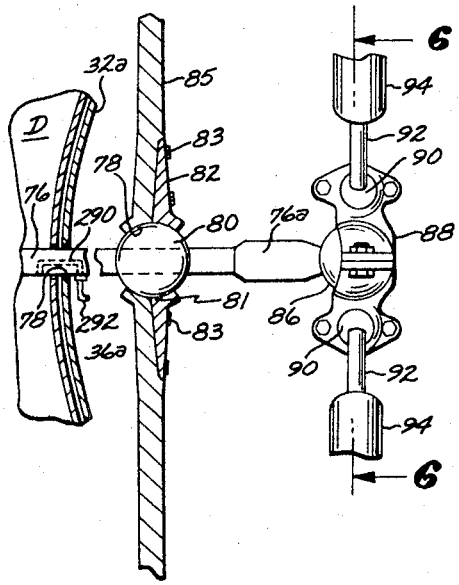
FIGURE 4 is a fragmentary transverse cross-sectional and bottom plan view of one of the wing control units, taken on the line 4—4 of FIGURE 2.

Two hollow wings D extend outwardly in opposite directions from shell 32 (FIGURE 3), and these wings are capable of being pivoted on their longitudinal axes. Each wing D, as shown in FIGURE 4, includes a longitudinally extending beam 76 that projects into an opening 78 formed in a convex shell portion 32a to enter compartment 22. The inner portion of each beam 76 is of octagonal transverse cross section and is slidably engaged by a recessed member 76a. A first ball 80 is mounted on beam 76 inwardly from opening 78. Ball 80 is movably supported in a socket 81 defined in a wall 85 by a plate 82 secured thereto by bolts 83. The wall 85 is disposed inwardly from shell portion 32a a short distance as may be seen in FIGURE 4.

Each beam 76 extends through a first ball 80 to terminate on the end thereof in compartment 22 in a second ball 86. In FIGURE 4 it will be seen that each second ball 86 is pivotally engaged by an elongate connector 88, the ends of which pivotally engage a pair of third balls 90. Balls 90 are mounted on the upper ends of piston rods 92 that are slidably movable in hydraulic cylinders 94. Cylinders 94 are pivotally supported in the compartment 22 by trunnion bearings 96. Hydraulic fluid under pressure may be discharged into and out of opposite interior end portions fo cylinders 94 through conduits 98 and 100, as illustrated in FIGURES 7 and 12. By control of hydraulic fluid to each pair of cylinders 94, the wings D may be pivoted upwardly and downwardly in unison relative to the hull B.

A rigid lug 102 projects from each support 66 that is pivotally connected to a piston rod 104 which is slidably movable in a hydraulic cylinder 106. Each hydraulic cylinder 106 is disposed in a direction normal to the longitudinal axis of the support 66 with which it is associated, with each cylinder being pivotally supported in compartment 22 on a trunnion bearing 108. Hydraulic fluid may be discharged into and out of each cylinder 106 through conduits 110 and 112 in the manner shown in FIGURES 7 and 12. Flow of hydraulic fluid to cylinders 106 results in the movement of lugs 102 and pivotal movement of supports 66 to vary the positions of the propellers 72 and 74 relative to the vehicle A. Such positioning of the propellers is highly important in that it not only powers the vehicle but controls the direction in which the vehicle travels, particularly when submerged.

A flat, triangular hollow member E that serves both as a rudder and elevator is disposed rearwardly of hull B, as may be seen in FIGURE 3. A beam 114 extends the length of member E and is, in the main, concealed within the interior thereof. However, a minor part of beam 114 projects forwardly from member E and passes through an opening 116 in the rear of hull B. The forward portion of beam 114 is of octagonal transverse cross section and removably engages a recessed rigid member 114a. A ball 118 is mounted on beam 114 rearwardly of member 114a, and is pivotally supported in a socket 120 provided in a transverse plate 122 affixed to the rear interior extremity of hull B, as shown in FIGURE 7.

A second ball 124 is secured to the forward end of member 114a. Ball 124 is pivotally engaged by an elongate rigid connector 126 that also pivotally engages two transversely spaced balls 128 (FIGURE 6) that are secured to the upper ends of piston rods 130. The piston rods 130 are slidably movable in hydraulic cylinders 132, also shown in FIGURE 6, and these cylinders are pivotally supported on trunnion bearings 134 secured to the hull B (FIGURE 12). When hydraulic fluid under pressure is discharged to and from cylinders 132 at the same rate, the member E is pivoted upwardly and downwardly relative to hull B. However, when the rate of fluid discharge to the two cylinders 132 is different, the member E is pivoted longitudinally along the axis of beam 114. The means for controlling flow of hydraulic fluid to cylinders 132 is shown in FIGURE 12, and will be described in detail hereinafter.

In FIGURES 7 and 12 it will be seen that an internal combustion engine 135 is positioned in the upper part of compartment 62 and fuel is fed thereto through a conduit 136 extending from a reservoir 138. Exhaust from engine 135 is discharged into 140 that preferably extends longitudinally through fin 36.

Engine 135 drives the pump 142 (FIGURE 12), and a suction line 144 extends from this pump to a hydraulic fluid reservoir 146. Pump 142 discharges fluid under pressure into a line 148 that extends to a manifold 150. In the event the pressure in line 148 rises above a predetermined maximum, a spring-loaded relief valve 152 connected to the discharge of pump 142 opens to allow fluid to bypass back into suction line 144 through a line 154.

A source of electrical energy 156 such as storage batteries or the like, are situated within a watertight hollow structure 158, preferably disposed in compartment 62 (FIGURE 7). Two electrical conductors 160 and 162 extend from the energy source 156 to junction points 160a and 162a.

An electrical conductor 164 extends from junction point 160a to a motor 166, as shown in FIGURE 12. An electrical conductor 168 extends from motor 166 and is connected to one terminal of a manually operable switch 170, which is also connected by a conductor 172 to junction point 162a.

When switch 170 is closed, motor drives a pump 174 (FIGURE 12) from which a suction line 176 extends to reservoir 146, and a discharge line 178 that is connected to line 148. A relief valve 180 is connected to the discharge of pump 174. Relief valve 180 allows fluid to flow back to suction line 176 through a line 183 when the pressure of the discharged fluid rises above a predetermined maximum pressure. Batteries 156 or the like are used as a source of energy when the vehicle A is submerged, and the engine 135 performs the same function when the vehicle is skimming along the surface of the water or flying thereabove.

Five three-way valves 184, 186, 188, 190 and 192 are connected to the manifold 150, as may be seen in FIGURE 12. Lines 184a, 184b, 186a, and 186b extend from valves 184 and 186, and these lines are connected to lines 100 and 98 leading to the cylinders 94, also shown in FIGURE 12. Manipulation of the valves 184 and 186 permit desired pivotal movement of the wings D. Lines 194 and 196 lead from valve 192 and are connected to the conduits 110 and 112 that are in communication with the interior of cylinders 106. Manipulation of valve 192 permits wings D to be pivoted on the longitudinal axes thereof. By means of lines 188a, 188b, 190a and 190b which extend from valves 188 and 190, respectively, to the cylinders 132, the flow of hydraulic fluid to the cylinders is so controlled as to permit the member E to be pivoted to a desired position relative to the hull B. To minimize complicating FIGURE 12, the return lines from valves 184, 186, 188, 190 and 192 have not been shown.

The motors 68 receive energy from the source of electrical energy 156 by means of the circuit described hereinafter. A conductor 198 (FIGURE 12) extends from a junction point 198a. Two conductors 200 extend from the junction point 198a to terminals of the two motors 68, and the other terminals of these motors are connected by two conductors 202 that extend to a junction point 202a. A conductor 204 leads from junction point 202a to one terminal of a switch 206, with the other terminal of the switch being connected by a conductor 208 which extends to junction point 162a. Closing of the switch 206 energizes the motors 68 to drive the propellers 72 when the vehicle A is submerged.

A conduit 209 is connected to tank 64. The conduit 209 has two branches 210 and 212 which lead to two three-way valves 214 and 216, respectively. Two conduits 218 extend from valve 214 to the upper portion of compartment 20. Two branch conduits 218a and 220a extend from the conduits 218 and 220 to the upper portion of compartment 22. By manual manipulation of valve 214, air may be discharged into compartment 20 to displace water ballast therefrom through valve 56. Conduits 222 and 224 extend from valve 216 to permit air to be discharged to and from the same. Flow of water into and out of the compartments 20 and 24 to cause the vehicle A to submerge or surface is controlled by a number of air-operated water ballast valves 56 one of which is shown in detail in FIGURE 9.

In each portion of the hull B in which one of the valves 56 are installed a tapped opening 226 is formed that is engaged by an externally threaded lower portion 228 of a valve housing 230. A plate 232 in which a port 234 is formed is in longitudinal alignment with hull B and is threaded into the housing 230.

Housing 230 (FIGURE 9) has a cylindrical projecting portion 236 in which a valve seat 238 is defined. A hollow buoyant body 240 is slidably mounted in housing 230, and a ring-shaped valve member 242 projects from this body that may sealingly engage seat 238 when the valve member is moved towards the hull B.

The valve 56 is closed when air under pressure is discharged into the interior thereof through a conduit 241 to force the body 240 towards hull B. When the air pressure is released, the pressure on the water externally of hull B forces the body 240 inwardly. Water thereafter flows through port 234 to discharge through openings 244 in the projecting portion 236 to pass into the interior of hull B. When a desired quantity of water has entered one of the compartments 20 or 24, air under pressure is discharged into the valves 56 associated therewith to close these valves and terminate the flow of water. In an emergency each valve 56 may be closed and held in a closed position by rotating a threaded rod 246 that engages a tapped opening 248 formed on the interior of housing 230, as shown in FIGURE 9. The flow of air under pressure to the conduits 241 is effected by means of valves (not shown) located adjacent to the seat 52.

The closed structure 158 in which batteries 156 or the like are disposed, has a top 250 best seen in FIGURES 8 and 10, which is provided with a number of spaced externally threaded tubular bosses 252 that project therefrom. Each boss 252 is engaged by a tubular cap 254 that includes a T-shaped member 256. Members 256 are connected by tubes 258, with one of the tubes extending upwardly in the hull B, as may be seen in FIGURE 7, to terminate in a vent valve 260. The vent valve 260 permits gases generated by the operation of batteries 156 to escape from the interior of hull B. Valve 260 is of such structure that water on the exterior of hull B cannot flow through tubes 258 to the interior of structure 156 when the vehicle A is submerged.

A valve 262 is connected to manifold 150 by a conduit 264. Two fluid conducting lines 266 extend to the inlets of the two hydraulic motors 70 (FIGURE 12) to drive the same. The discharges of the two hydraulic motors 70 are connected to a fluid return line 268 that leads to the reservoir 146. A conduit 270 extends from manifold 150 to a multi-position valve 272 that has suitable discharge lines 274 and check valves 276 associated therewith in such a manner that valves 184 and 186 may be by-passed and the two pairs of cylinders 94 operated independently of one another. Such operation of the cylinders 94 is desirable when the wings C are moved independently for guiding purposes when the vehicle A is submerged.

Two power-driven bilge pumps 278 are provided in the forward and aft portions of the hull B, and are used to discharge water from compartments 20 and 24 when air under pressure is not used for this purpose. Each bilge pump 278 is provided with a water inlet line 280, and water discharge line 282 is connected thereto.

Following is a description of the use and operation of the vehicle A. When it is desired to skim along or fly over the surface of a body of water on which the vehicle A floats, the engine 134 is actuated to drive pump 142. Fluid under pressure is discharged to the motors 70 to drive the propeller 74. Control of the speed at which the propeller 74 is driven is effected by use of the valve 262. By use of the valves 184, 186, 188, and 190 the positions of the wings C and rearwardly positioned flat member E may be manipulated for either skimming or flying. A check valve 284 is interposed in discharge line 178 between the discharge of pumps 142 and 174 to prevent passage of hydraulic fluid from pump 142 back into reservoir 146 through pump 174.

The vehicle A is caused to travel under water by opening the valves F to admit water into the hull b, and closing switch 170 to actuate motor 166. Motor 166 drives pump 174 and thereby supply hydraulic fluid to the manifold 150, which is thereafter used to control the positions of the wings D and member E in the manner described. When the switch 206 is closed, the motors 68 are electrically energized to drive the propeller 72 and propel the vehicle A below the surface of the body of water. A check valve 286 is connected to the discharge of pump 142 to prevent the passage of hydraulic fluid under pressure back into the reservoir 146 through the pump 142 and line 144 when the vehicle A is traveling under water. When it is desired to cause the vehicle A to surface, valves 56 are placed in an open position, and air under pressure is caused to flow into compartments 20 and 24 to discharge water therefrom. The pumps 278 may also be used for discharging water from compartments 20 and 24 if desired.

The top 250 of structure 158 in which batteries 156 are positioned also has a number of spaced, externally threaded second bosses 281 projecting upwardly therefrom. A battery terminal 282 extends upwardly in each boss 281. The conductors 160 and 162 each have a number of spaced, doubled-over portions, and one of these doubled-over portions 160' is shown in FIGURE 11. The sides of each portion 160' is sheathed by a shouldered cylindrical plug 285. An internally threaded cap 287 of an electrical insulating material rotatably engages each plug 285, and threadedly engages one of the second bosses 281. When one of the caps 287 is rotated onto one of the bosses 281, the lower bare end of one of the doubled-over portions 160' is forced into pressure contact with one of the terminals 283 to effect an electrical connection therewith.

Electrically operated valves 288 are located in the lower portions of each wing D and member E, and these valves are normally closed. When valves 288 are selectively opened by completing an electrical circuit thereto (not shown), water my flow into the interior of the wings D or member E to act as ballast. Obviously, the vehicle A must either be submerged, floating on, or traveling on the surface of a body of water to enable the valves 288 to admit water into the interior of the wings D or member E when the valves are opened.

Figure 5:
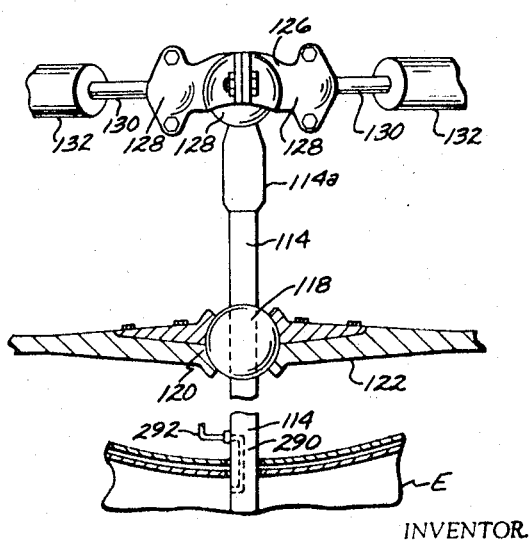
FIGURE 5 is a fragmentary top plan view of the tail control unit, taken on the line 5—5 of FIGURE 1.

Passages 290 are formed in beams 76 and 114 shown in FIGURES 4 and 5 to permit ejection of ballast water in the wings D and member E therefrom. Passages 290 are connected to flexible hoses 292 which extend to pump means (now shown) located in the vehicle A. Ballast water is discharged from the pump means to the exterior of the vehicle.

An alternate form G of the vehicle is shown in FIGURES 12–16 that includes an enclosed hull 300, the center portion 302 of which is of maximum transverse cross section. A hinged hatch 302a is located in the upper part of center portion 302, and this center portion merges into forwardly and rearwardly extending tapered portions 304 and 306, respectively. Portion 302 is partially defined by a U-shaped transparent member 308, illustrated in FIGURE 13.

Two elongate hydrofoils 308 project outwardly in opposite directions from the center hull portion 302. Members 308 are preferably of hollow construction, and a longitudinally extending beam 310 is secured to the interior of each of these members by conventional means. The beams 310 project from the inner ends of the hydrofoils 308 and pass through openings 312 provided in the central hull portion 302. Each beam 310 is secured to a first ball 314 that is rotatably mounted in a wall-supported socket structure 316 located in the hull 300. An elongate extension 318 projects inwardly from each ball 314 to terminate in a second ball 320, and each second ball is pivotally mounted in a socket 322 forming a part of a lever 324. The lower portion of each lever 324 is connected to a third ball 326 that is rotatably supported in a base 328, each of which is secured to a floor 330 provided in hull 300.

A circular housing 332 (FIGURE 14) having an airfoil transverse cross section 334 is disposed rearwardly of hull 300 and positioned in a plane normal to the longitudinal axis thereof. A number of circumferentially spaced legs 336 extend inwardly from housing 332 to a hydraulic motor 338 situated in the center of housing 332, and which drives a propeller 340 also disposed within housing 332.

Motor 338 is mounted on the rear end of an elongate rigid member 341 that projects forwardly through an opening 300a formed in the rear end of hull 300, as shown in FIGURE 15. The forward end of member 341 is connected to a fourth ball 342 that is rotatably supported in a transverse wall structure 344 situated in the rear section of hull 300, as also illustrated in FIGURE 15. An extension 346 projects forwardly from the fourth ball 342 and terminates in a transversely positioned cross piece 348, which is provided with two ball and socket connections 350 on the ends thereof that are attached to the upper ends of piston rods 352. The rods 352 are slidably movable in hydraulic cylinders 354 (FIGURE 15), and are pivotally supported on the floor 330 by conventional means 357. Hydraulic fluid under pressure may be discharged into and out of each cylinder 354 through two conduits 358 and 360.

When hydraulic fluid is discharged at the same rate to and from the cylinders 354, the housing 332, motor 338 and propeller 340 are moved upwardly and downwardly relative to the hull 300. However, by discharging hydraulic fluid at different rates to the two cylinders 354, a differential in the rate of movement of the piston rods 352 is attained whereby sidewise movement is imparted to the housing 332, motor 338 and propeller 340, which permits the hull 300 to be guided as the same is driven forwardly by rotation of the propeller. The motor 338 is actuated by hydraulic fluid under pressure flowing to and from the motor through two passages 356 formed in member 341, base 342, and extension 346. Pressure 356 are connected by conduits 358 to a source of hydraulic fluid under pressure and a reservoir (not shown). If desired, a stabilizing fin 360 may be supported from the lower portion of the housing 332, as shown in FIGURE 15.

A normally closed, electrically operated valve 362 located in the lower portion of housing 332 is in communication with the interior thereof. When the housing 332 is in contact with the body of water 364 on which the form G vehicle floats, and the valve 362 is energized from the source of electrical power (not shown), the valve opens to admit ballast water to the interior of the housing. Water may be withdrawn from the interior of housing 332 by pump means (not shown) connected to a conduit 366 that is in communication with the interior of the housing.

The use of the alternate form G of the vehicle is relatively simple. The operator (not shown) is situated within the hull 300 in a position between the two levers 324, the motor 338 is actuated to cause the propeller 340 to rotate and the vehicle G moves forwardly. As the travel speed increases, the levers 324 are manipulated to dispose the hydrofoils 308 in proper positions where they serve their intended purpose, but have slight contact with the surface of water 364. By discharging hydraulic fluid under pressure to the cylinders 354, the position of the housing 332, propeller 340, and motor 338 may be varied to guide the vehicle as it skims along the surface of the water. Fin 360 acts as a stabilizer when the vehicle G is so moving.

Although the rear motor 338 in the alternate form G of the invention is illustrated in FIGURE 15 as being hydraulic, if desired, an electrical type may be employed that is energized from a source of power (not shown) positioned within the hull 300.

In the form A of the invention, flow of hydraulic fluid to the cylinders 132 to control positioning of the member E is achieved through two conduits 132a and 132b. Passage of hydraulic fluid through conduits 132a and 132b from a source (not shown) thereof is controlled by a foot-operated valve mechanism H illustrated in FIGURE 7.

In the form A of the invention, the compartments 20, 22, 24, fin 36, member E, and wings D, each at substantially the highest point in the interior thereof, may be supplied with air under pressure to discharge ballast water therefrom through the valves 56. Air under pressure is delivered to such points through conduits J, one of which is shown in fin 36 in FIGURE 7. Similar conduits (not shown) are provided for the delivery of air under pressure to the highest interior portions of the hydrofoils 308 and housing 334 in the alternate form G of the invention.

In the form A of the invention, the member E, as previously mentioned, may be pivoted vertically, which is particularly useful in assuring short landings and take-offs of the vehicle. Form A of the vehicle is also provided with an air outlet valve 368 in the hatch 42, and this valve may be remotely operated by electricity, air or hydraulic fluid under pressure. Valve 368 is used to control the air pressure in compartment 22.

To permit vertical movement of the hydrofoils 308 of the alternate form G of the invention, the levers 324 below the balls 320 include hydraulic mechanisms 370 (FIGURE 16) to elongate and contract the length of the levers. The mechanisms 370 comprise hydraulic cylinders, pistons, and piston rods not shown in detail which are supplied with fluid under pressure from a source (not shown) within the confines of hull 300.

I claim:

1. An amphibious vehicle for selectively traveling under water and above the surface thereof, including:
   (a) an elongate enclosed hull having a transparent upper center portion;
   (b) a plurality of transverse partitions in said hull that divide the same into at least forward, center, and rear compartments, with the operator of said vehicle being disposed in said center compartment;

(c) upper and lower hatches in said hull in communication with said center compartment;

(d) first power-operated means disposed exteriorly of said hull for selectively driving said hull under said water or above the surface thereof;

(e) second hydraulically operated means for supporting said first means from said hull and moving said first means for guiding said vehicle;

(f) two transversely disposed hollow wings that extend outwardly in opposite directions from said hull;

(g) third hydraulically operated means that support said wings from said hull and permit said wings to be moved upwardly and downwardly relative to said hull as well as permitting said wings to be pivoted on the longitudinal axis thereof;

(h) a vertically disposed fin extending upwardly from the rear of said hull;

(i) a flat hollow member disposed rearwardly of said hull;

(j) fourth hydraulically operated means for moving said flat member upwardly and downwardly relative to said hull as well as pivoting said member on its longitudinal axis;

(k) remote controlled valve means for admitting ballast water into said forward and rear compartment and permitting discharge of ballast water therefrom;

(l) fifth means for selectively discharging a gas under pressure into said compartments, with said gas displacing ballast water from said forward and rear compartments when said value means are in an open position with said gas permitting water to flood said center compartment but to a desired height when said lower hatch is in an open position;

(m) sixth pump means in said hull for supplying hydraulic fluid under pressure to said second third and fourth means; and (n) power means in said hull for driving said sixth means with said vehicle being capable of traveling above the surface of a body of water to a desired destination and then submerging to a desired depth with said lower hatch open to permit said operator to leave said vehicle underwater to engage in a salvage or rescue mission.

2. A vehicle as defined in claim 1 wherein said first power-operated means includes:
(o) two hydraulic motors on opposite sides of said hull; and
(p) two propellers driven by said motors when hydraulic fluid is discharged thereto from said sixth means.

3. A vehicle as defined in claim 1 wherein said first power-operated means includes:
(o) two electric motors on opposite sides of said hull;
(p) two propellers driven by said electric motors when said motors are electrically energized; and
(q) a source of electric energy in said hull for energizing said motors.

4. A vehicle as defined in claim 2 wherein said second means includes:
(q) two elongate rigid members rotatably supported from said hull and extending outwardly from opposite sides thereof with said motors being supported from the outer ends of said members;
(r) two lugs projecting outwardly from the inner ends of said members;
(s) two piston rods pivotally connected to the free ends of said lugs;
(t) two hydraulic cylinders in which said rods are slidably mounted which cylinders are pivotally supported from said hull;
(u) a plurality of conduits connected to said cylinders and to said sixth means; and
(v) valve means operatively associated with said conduits to control flow of fluid to said cylinders to permit said motors and propellers to be moved through an arcuate path.

5. A vehicle as defined in claim 3 wherein said second means includes:
(q) two elongate rigid members rotatably supported from said hull and extending outwardly from opposite sides thereof with said motors supported from the outer ends of said members;
(r) two lugs projecting outwardly from the inner said members;
(s) two piston rods pivotally connected to the free ends of said lugs; and
(t) two hydraulic cylinders in which said rods are slidably mounted which cylinders pivotally supported from said hull.

6. A vehicle as defined in claim 1 wherein said third means includes:
(o) two longitudinally extending beams in said wings extending through openings in said hull;
(p) means in said hull for pivotally supporting the inner end portions of said beams; and
(q) hydraulic means operatively associated with the inner ends of said beams for moving said inner ends upwardly and downwardly relative to said hull as well as for pivoting said beams on the longitudinal axis thereof.

7. A vehicle for skimming along the surface of a body of water, including:
(a) an elongate hull having a transparent upper center portion;
(b) two wings disposed on opposite sides of said hull;
(c) first means for so supporting said wings from said hull that each of said wings can be moved independently through an arcuate path relative to said hull;
(d) a circular housing disposed transversely rearwardly of said hull;
(e) a hydraulic motor centrally disposed in said housing;
(f) a plurality of circumferentially spaced legs which support said housing from said motor;
(g) an elongate forwardly extending member affixed to said motor that projects through an opening provided in the rear section of said hull;
(h) second means for pivotally supporting a forward portion of said member from said hull;
(i) a source of hydraulic fluid under pressure in said hull;
(j) conduit means for driving said motor with fluid from said source;
(k) a propeller disposed in said housing and driven by said motor; and
(l) third means in said hull operated by fluid from said source and connected to said member for moving said housing, motor, and propeller as an assembly to guide said vehicle.

8. A vehicle as defined in claim 7 wherein said second means includes:
(m) two longitudinally extending beams connected to said wings and extending into said hull through openings formed therein;
(n) two balls connected to the inner end portion of said beams; and
(o) wall structures in said hull for pivotally supporting said ball.

9. A vehicle as defined in claim 8 wherein said first means include:
(p) two laterally spaced wall-supported levers; and
(q) means on said levers for pivotally engaging inwardly disposed extremities of said beams.

10. A vehicle as defined in claim 7 wherein said housing is hollow and has an airfoil of transverse cross section.

11. A vehicle as defined in claim 1 in which said power operated means include:

(q) two adjustably supported motors disposed on opposite sides of said hull; and (r) two propellers driven by said motors, which motors and propellers may be so adjusted as to provide a downwardly, rearwardly and outwardly extending backwash that in conjunction with forces derived from the adjustment of said wings and said member stabilizes the movement of said vehicle during the take-off and landing thereof.

References Cited

UNITED STATES PATENTS

| 3,038,431 | 6/1962 | Bajulaz | 114—16 |
| 3,204,596 | 9/1965 | Fallon | 114—16 |

TRYGVE M. BLIX, Primary Examiner

U.S. Cl. X.R.

115—35, 70; 244—47, 48, 52